(No Model.) 2 Sheets—Sheet 1.
A. E. DAIN.
VEHICLE AXLE BEARING AND HUB.
No. 573,394. Patented Dec. 15, 1896.
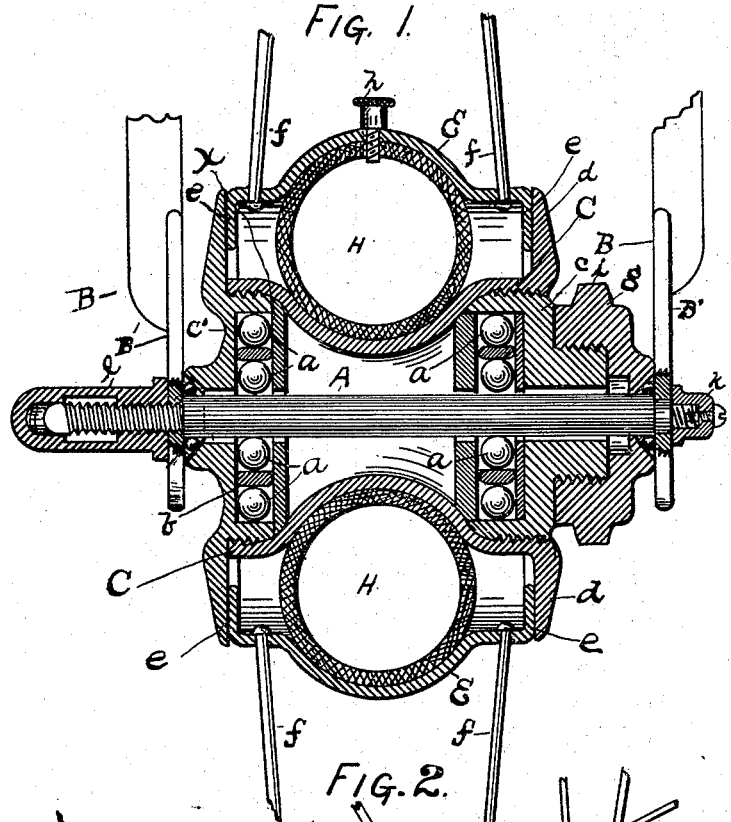
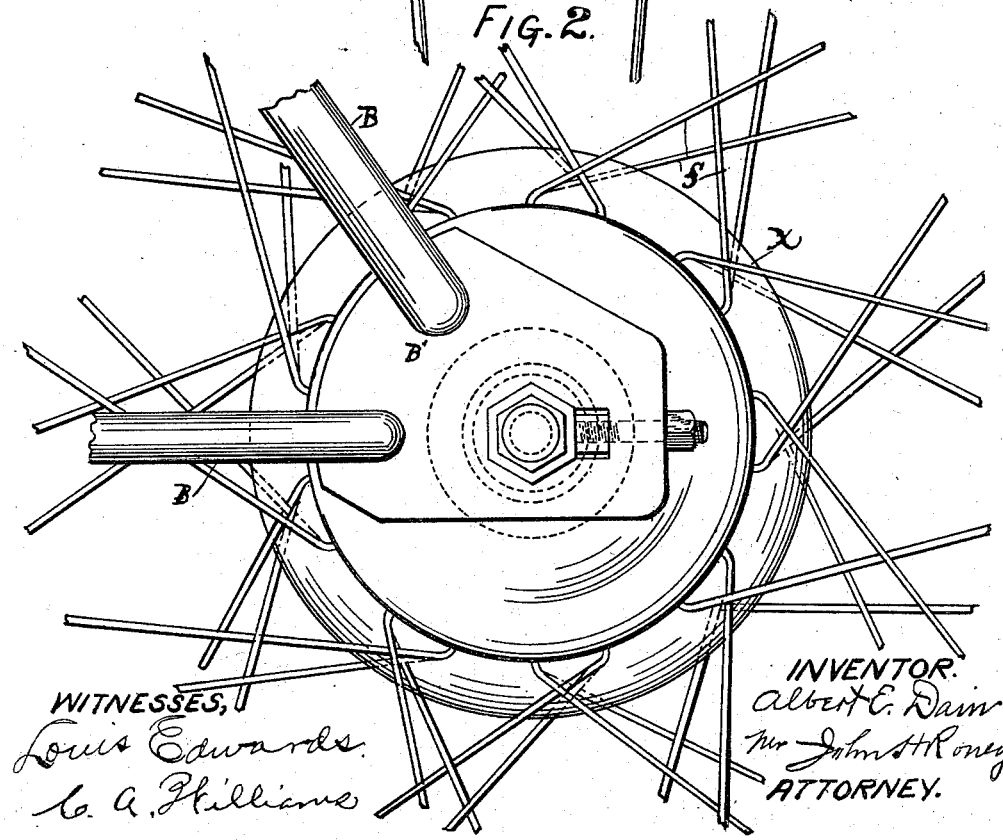
WITNESSES,
Louis Edwards
C. A. Williams
INVENTOR.
Albert E. Dain
per John H. Roney
ATTORNEY.

(No Model.) 2 Sheets—Sheet 2.

A. E. DAIN.
VEHICLE AXLE BEARING AND HUB.

No. 573,394. Patented Dec. 15, 1896.

WITNESSES:
Louis Edwards
C. A. Williams

INVENTOR
Albert E. Dain
BY John H. Roney
ATTORNEY.

UNITED STATES PATENT OFFICE.

ALBERT E. DAIN, OF PITTSBURG, PENNSYLVANIA.

VEHICLE AXLE-BEARING AND HUB.

SPECIFICATION forming part of Letters Patent No. 573,394, dated December 15, 1896.

Application filed September 28, 1896. Serial No. 607,125. (No model.)

*To all whom it may concern:*

Be it known that I, ALBERT E. DAIN, a citizen of the United States, residing at Pittsburg, in the county of Allegheny and State of Pennsylvania, have invented certain new and useful Improvements in Vehicle Hubs and Axle-Bearings; and I do hereby declare the following to be a full, clear, and exact description of the invention, such as will enable others skilled in the art to which it pertains to make and use the same, reference being had to the accompanying drawings, which form a part of this specification, in which—

Figure 3:
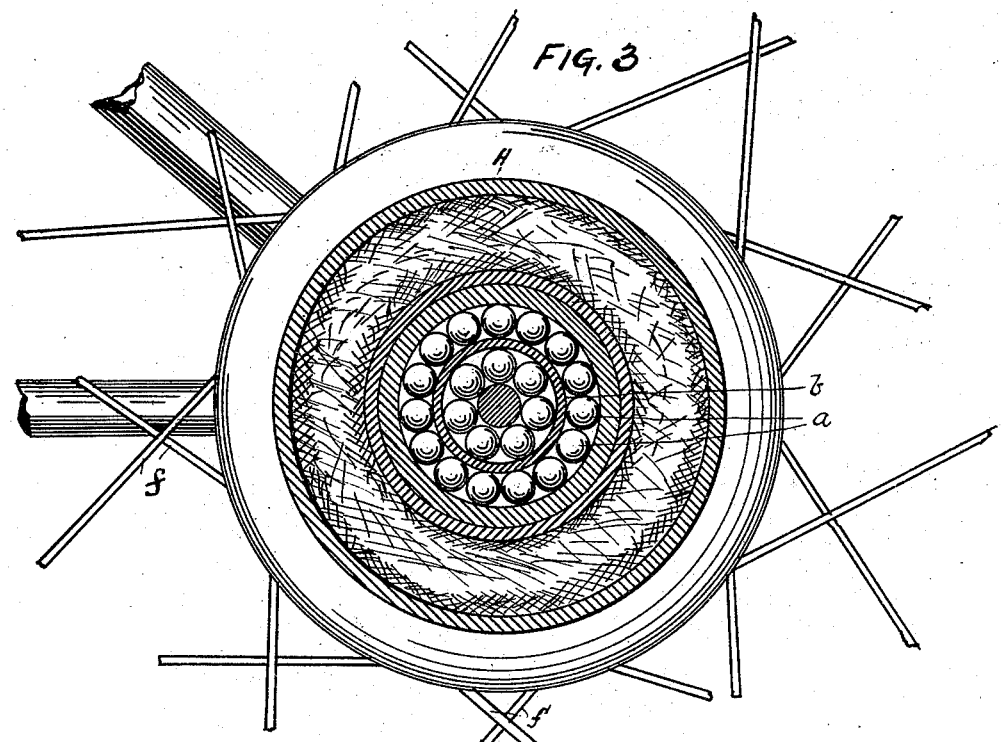
Figure 4:
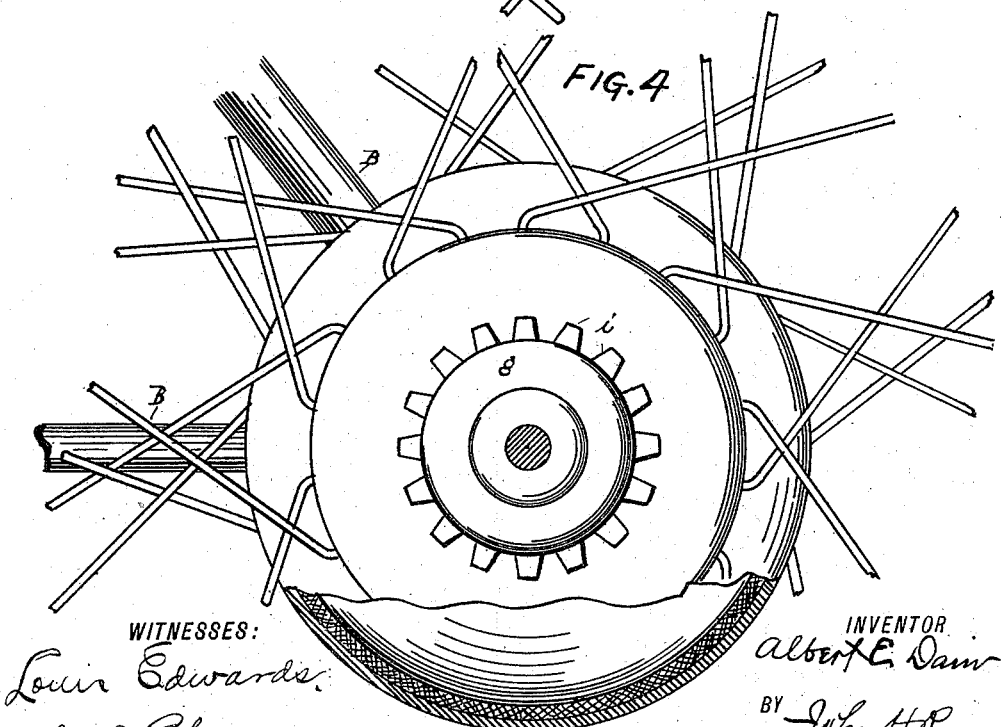

Figure 1 indicates a transverse vertical section of my improved bearing and pneumatic hub for vehicle-wheels. Fig. 2 is an elevation of the left side of the same. Fig. 3 is a vertical section on line $x\,x$ of Fig. 1. Fig. 4 is an elevation of the right side, partly in section.

My invention relates to hubs and bearings for vehicle-wheels, and is especially adapted to use on velocipedes and bicycles.

The object of my invention is to produce a hub and bearing in which a pneumatic bearing is interposed between the spoke-section and main section of the same, whereby such resiliency is obtained as to enable the use of a pneumatic tire of great thickness, comparatively, whereby the danger of puncture will be largely reduced, or to entirely dispense with the pneumatic tire and to substitute therefor a solid-rubber tire, which will entirely obviate the bad results occasioned by puncturing the ordinary tire. To this purpose my invention consists in the novel construction and arrangement of parts hereinafter described and specifically claimed.

Referring to said drawings, A is a stationary axle the ends of which are respectively secured in the lower ends of the fork B, or, as shown in the drawings, in the large plate B', terminating in the ends of said fork.

X is a hub revolubly mounted on said axle on the ball-bearings $a\,a$, the upper set of said ball-bearings impinging upon the outer periphery of the revoluble antifriction-ring $b$, and the lower set of ball-bearings impinging upon the inner surface of said antifriction-ring and outer surface of said axle, said bearings being secured within the ball-bearing cups $c$ and $c'$, respectively, $c'$ forming the left side of the hub, and $c$ forming the major part of the right side thereof. Said cups $c$ and $c'$ are provided with screw-threads to engage corresponding threads upon the inner annular surface of the annular plate C, said plate being in cross-section convex and on one side provided with a projection or flange $d$.

E is an annular plate having projections or flanges $e\,e$ around the edges of the same, adapted to be seated neatly between the projecting flanges of the plate C and the upper edges of the cup $c'$, said annular plate E being in cross-section concavo, whereby a chamber concavo-convex is formed when said plates are adjusted, in which a pneumatic tube H is seated, a valve $h$ being connected thereto, whereby said tube may be inflated.

It is observed that the flanges around the edges of the annular plate E are shorter than the depth of the sides of the chamber formed by the adjustment or arrangement of the two annular plates C and E, as shown in Fig. 1, so that said annular plate E, in the upper or outer surface of which the lower end of the spokes $f\,f$ are secured, is enabled to move in the annular recess formed between the flanges or projections on the annular place C and the upper edges of the cup $c'$ accordingly as the inflatable tube H is distended by air-pressure, whereby the spoke-section of the hub is supported upon the pneumatic bearing for the purpose, as before stated, of producing an easy-riding wheel, a pneumatic tire thereon being dispensed with.

$g$ is a cap having on the inner face of the same a socket internally screw-threaded to engage a correspondingly-threaded projecting portion of the cap $c$. The outer periphery of the cap $g$ is provided with sprocket-wheel $i$.

$k$ and $l$ are, respectively, nuts for the purpose of securing the axle rigidly to the plate forming the lower end of the fork, said nut $l$ also serving as a step for the purpose of mounting the wheel.

Having described my invention, what I claim, and desire to secure by Letters Patent, is—

1. In a combined pneumatic hub and axle-bearing, the combination of the inflatable tube seated between two concavo-convex plates, the upper one of which is capable of distention by the pressure of the tube, and a series of ball-bearings, having a revoluble antifriction-ring interposed between the same, substantially as described.

2. In a combined pneumatic hub and axle-bearing, the combination of two concavo-convex plates, one of which is provided with flanges on both sides, the other with a flange on one side thereof; an inflatable tube interposed between said plates; a series of ball-bearings, and a revoluble antifriction-ring interposed between said bearings, substantially as described.

3. The combination of a hub revolubly mounted on an axle, having two annular concavo-convex plates, one of which is provided with flanges on both sides, and the other with flanges on one side thereof; an inflatable tube interposed between said plates; a series of ball-bearings; a revoluble antifriction-ring interposed between said bearings, and cups for said bearings connected to the inner annular concavo plate, substantially as described.

In testimony that I claim the foregoing I hereunto affix my signature this 24th day of September, A. D. 1896.

ALBERT E. DAIN. [L. S.]

In presence of—
 JOS. T. HOCHSWENDER,
 C. A. WILLIAMS.